Aug. 21, 1928.

A. D. LONG 1,681,864

TIRE CARRYING RIM SUPPORT

Filed May 3, 1927  2 Sheets-Sheet 1

A. D. Long
INVENTOR
BY Victor J. Evans
ATTORNEY

WITNESS:

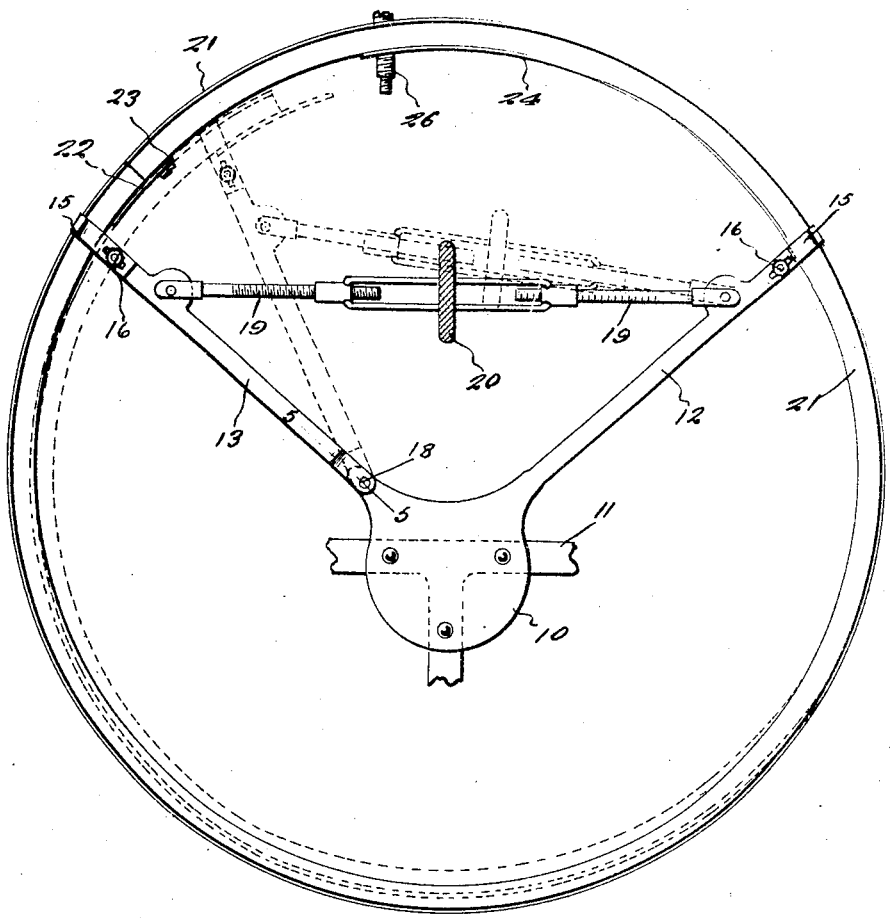
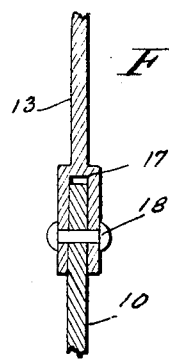

Patented Aug. 21, 1928.

1,681,864

UNITED STATES PATENT OFFICE.

ARTHUR D. LONG, OF EL PASO, TEXAS.

TIRE-CARRYING RIM SUPPORT.

Application filed May 3, 1927. Serial No. 188,531.

This invention contemplates the provision of a tire carrying rim support, including means whereby the rim can be quickly and conveniently contracted or expanded in order to move the tire rim from the support or place it in position thereon as the occasion may require.

In carrying out the invention, I contemplate the provision of a tire rim support including a curved extension having a valve stem receiving opening, so that the tire rim can only be placed upon the support in its proper position, so that the rim can be contracted or expanded when desired.

The nature and advantages of the invention will be better understood when the following detailed description is read in connection with the accompanying drawing, the invention residing in the construction, combination and arrangement of parts as claimed.

In the drawings forming part of this application, like numerals of reference indicate similar parts in the several views, and wherein:

Figure 2 is a view showing a tire carrying rim mounted on the support, the normal position of parts being indicated by full lines, and the juxta-position by dotted lines.

Figure 3 is a fragmentary view of the support showing the curved extension above referred to.

Figure 5 is a sectional view taken on line 5—5 of Figure 2.

Figure 1:
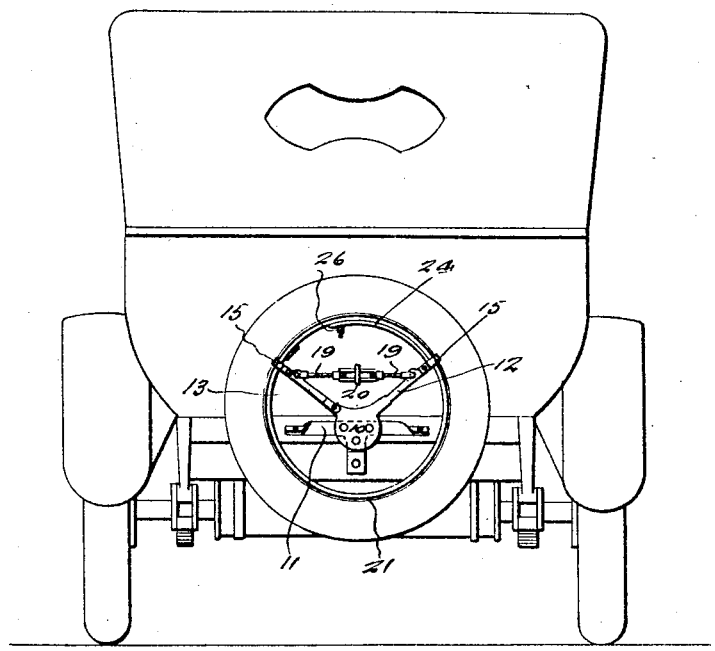
Figure 1 is a rear elevation of an automobile showing the rim mounted upon the support.
Figure 3:
Figure 4:
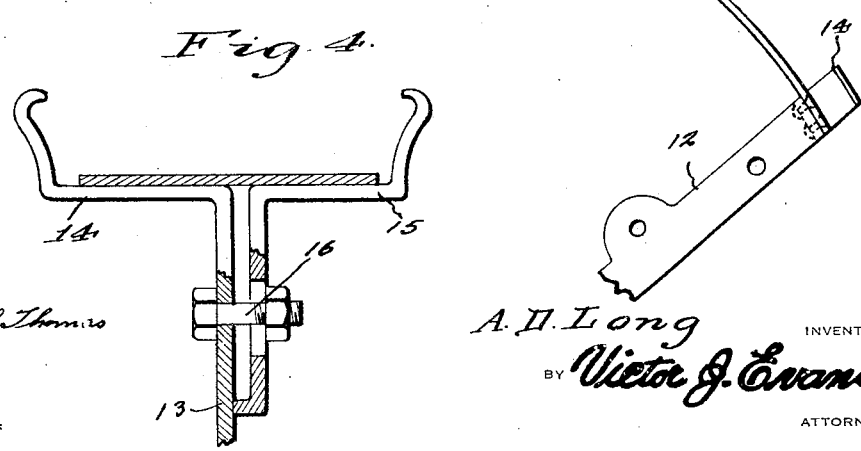
Figure 4 is a fragmentary view of the rim support.

The tire carrying rim support constructed in accordance with the present invention, comprises a plate 10, which is adapted to be attached to a suitable bracket 11 carried by the automobile at any desired location. Supported by the plate 10 and arranged in diverging relation are arms 12 and 13 respectively, the former being rigidly connected with the plate 10, while the arm 13 is mounted for pivotal movement thereon as clearly illustrated in Figure 2. Each of these arms is extended at its outer end to provide a clamping jaw 14, while a similar jaw 15 is mounted on each arm and held associated therewith by means of a bolt 18 as illustrated in Figure 4. The lower end of the arm 13 is bifurcated as at 17 to straddle the plate 10 and is pivoted by means of a pivot 18 illustrated in Figure 5.

By reason of this construction, the tire carrying rim can be conveniently placed between the jaws of the respective arms, and by tightening the nut on the bolt 16, the rim is properly positioned or supported. The arms 12 and 13 are connected together by a turnbuckle, the sections 19 of which are pivotally connected with the respective arms, while a hand wheel 20 is employed for operating the turn-buckle, so that the tire carrying rim can be contracted or expanded with very little effort. The tire carrying rim is indicated at 21, and is of the split type, the ends being arranged in face to face contact when the rim is in normal condition. Carried by one end of the rim, is a retaining plate 22 having an opening to receive a lug 23 carried by the adjacent end, the retaining plate of course bridging the meeting ends as clearly shown in Figure 2.

In order to contract or expand the rim 21, it is essential that the break or split of the rim be located with relation to the arm 13 in the manner illustrated by full lines in Figure 2, and therefore in order that the rim may be properly positioned upon the support, to bring the break or split of the rim in this position, I contemplate the use of a curved extension 24 which is carried by the stationary arm 12. This extension 24 may be of any desired length, and provided with an opening 25 to receive the valve stem 26 of the tire. Consequently, when the rim 21 is being mounted upon the supporting structure, it is necessary to pass the valve stem 26 through the opening 25 of said extension, and in order to do this, the split or break in the rim 21 is brought into the position with relation of the arm 13 as shown in Figure 2. Therefore, when it is desired to contract the rim in order to facilitate the placing of a tire thereon or the removal of a tire therefrom, it is only necessary to operate the hand wheel 20 in order to shorten the turn-buckle above referred to, whereupon the arm 13 is moved to the position illustrated by dotted lines in Figure 2, bringing one end of the rim 21 downwardly and inwardly to the position shown by dotted lines in said figure. Of course the rim is expanded by reversing the operation of the turn-buckle, but by reason of the construction and arrangement of parts illustrated, this contraction or expansion of the rim can be accomplished by any one, and with very little effort.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

In combination, a split tire carrying rim, supporting means therefor comprising a stationary plate, a rigid arm projecting from said plate, a second arm mounted for pivotal movement on said plate, said arms being arranged in diverging relation and designed to engage the rim at spaced points, a curved extension carried by the rigid arm and arranged to engage the said rim, said extension having an opening adapted to receive the valve stem of the tire for the purpose specified, and means for operating the movable arm to either contract or expand said rim.

In testimony whereof I affix my signature.

ARTHUR D. LONG.